US006887582B2

(12) United States Patent
Lee et al.

(10) Patent No.: US 6,887,582 B2
(45) Date of Patent: May 3, 2005

(54) POLYOLEFIN FILM FOR USE IN COLD SEAL COHESIVE APPLICATIONS

(75) Inventors: Mark S. Lee, North Kingstown, RI (US); Leo Moreau, North Kingstown, RI (US); Kevin Kitchin, North Kingstown, RI (US)

(73) Assignee: Toray Plastics (America), Inc., N. Kingstown, RI (US)

( * ) Notice: Subject to any disclaimer, the term of this patent is extended or adjusted under 35 U.S.C. 154(b) by 200 days.

(21) Appl. No.: 10/270,237

(22) Filed: Oct. 15, 2002

(65) Prior Publication Data

US 2003/0072957 A1 Apr. 17, 2003

Related U.S. Application Data

(60) Provisional application No. 60/328,410, filed on Oct. 12, 2001.

(51) Int. Cl.[7] .................................. B32B 27/32
(52) U.S. Cl. ............. 428/516; 428/355 R; 428/355 EN
(58) Field of Search ............... 428/516, 355 R, 428/355 EN; 525/240

(56) References Cited

U.S. PATENT DOCUMENTS

| 4,252,851 | A | | 2/1981 | Lansbury et al. |
|---|---|---|---|---|
| 5,482,780 | A | | 1/1996 | Wilkie et al. |
| 5,792,549 | A | | 8/1998 | Wilkie |
| 5,900,294 | A | | 5/1999 | Murschall et al. |
| 5,985,426 | A | * | 11/1999 | Wilkie ........................ 428/215 |
| 6,022,612 | A | | 2/2000 | Wilkie |
| 6,165,599 | A | | 12/2000 | Demeuse |
| 6,231,936 | B1 | * | 5/2001 | Kozimor et al. ........... 428/34.7 |
| 6,451,426 | B2 | * | 9/2002 | Kong et al. ........... 428/355 EN |
| 6,458,470 | B1 | * | 10/2002 | DeLisio et al. ............. 428/516 |
| 6,511,568 | B1 | * | 1/2003 | Eckstein et al. ............. 156/216 |
| 2002/0013415 | A1 | * | 1/2002 | Mechelaere et al. ........ 525/191 |

FOREIGN PATENT DOCUMENTS

| WO | IB-WO 98/10931 | 3/1998 |
|---|---|---|
| WO | WO 00/40406 | 7/2000 |

* cited by examiner

Primary Examiner—D. Lawrence Tarazano
(74) Attorney, Agent, or Firm—Morrison & Foerster LLP

(57) ABSTRACT

A polyolefin multilayer film containing a polyolefinic core layer and a first polyolefin skin layer of a blend, wherein the first polyolefin skin layer does not contain a thermoplastic or natural rubber and provides a cold seal receptive surface for a cold seal adhesive is disclosed. The blend includes an ethylene propylene random copolymer at 50–90 wt. % of the skin layer and metallocene catalyzed plastomer at 10–50% wt. % of the skin layer, a metallocene catalyzed isotactic polypropylene polymer or a butene propylene copolymer that contains from 5 wt % to 22 wt % of butene.

18 Claims, No Drawings

POLYOLEFIN FILM FOR USE IN COLD SEAL COHESIVE APPLICATIONS

RELATED APPLICATIONS

This application claims priority from Provisional Application Ser. No. 60/328,410, filed Oct. 12, 2001, entitled the same as above, the entire disclosure of which is hereby incorporated herein by reference.

FIELD OF INVENTION

The invention relates to polyolefinic multilayer film comprising a base layer of polypropylene, a first skin layer which is receptive to cold seal cohesive compositions, and optionally a second skin layer to be metallized. More specifically, the invention relates to a biaxially oriented polypropylene film providing a polymeric skin layer composition, which provides a cold seal receptive surface. In addition, the film could have a second skin layer, opposite the cold seal receptive skin layer, to be metallized.

BACKGROUND OF INVENTION

The term "cold seal" refers to sealing a package at ambient temperature, typically 15–26° C., as opposed to a high temperature sealant polymer that seals upon the onset of heat and pressure. Because of their ability to form seals without heat, cold seal cohesives are ideally suited to the packaging of heat sensitive products such as bakery and confectionery products. In addition, cold seal cohesives allow faster packaging speeds to be achieved relative to the heat seal method.

Cold seal cohesives are a class of adhesives that bond primarily to themselves by the application of pressure. These cohesives produce excellent face-to-face seals and adhere weakly or not at all with face-to-back contact. In conventional cold-seal cohesives, there are two essential components: a cohering component (natural or synthetic rubber) and a reinforcing polymer system component that stabilizes, promotes substrate adhesion, and influences the aggressiveness of the cold seal. Natural rubber in latex form is an extremely high molecular weight, branched and coiled polymer comprised largely of cis-polyisoprene. In a relaxed state, there are numerous molecular entanglements within the polymer chain and with adjoining polymer chains. When two surfaces of natural rubber are brought together, a minimum of energy is required to induce an interdiffusion with entanglements of surface molecules. This affinity that natural rubber molecules have for themselves characterizes the cohesive bond. Modifying components are added to natural rubber to improve adhesion to the substrate.

The performance of the cold seal can vary based on many factors. Cold seals are perishable and should be used within the suggested shelf life or the performance of the cold seal could be adversely affected. In addition, cold seal cohesives can also stratify in storage and should be stirred prior to use or the cold seal performance could be adversely affected. Also, cold seal cohesives typically have a pH in the 10.0–10.3 range. However, materials that have had a lot of mixing or excessive press time may exhibit a drop in pH. Typically, if the pH drops below 8.5 the cold seals may no apply and perform correctly. High heat and humidity storage of the coated products could adversely affect the performance of the cold seal. Finally, proper drying of the product will also affect its performance.

With most applications, the application of the cold seal is applied in a pattern around the perimeter of the lamination surface. These film laminations typically consists of 1) An outer print web film, 2) a film for direct application of the cold seal, and 3) an adhesive layer to bond the two films together. Typically, the film surface in which the cold seal cohesive is directly applied should preferably have very good adhesion to the cold seal cohesive. If this adhesion of the cohesive to the film substrate does not exist, the consequence will be package failure at the location where the cohesive is in contact with the film substrate. This failure will result in loss of hermetic seal and ultimately spoilage of the food product contained within the package. Cold seal coating weights of 2 to 4.5 lbs/ream satisfies most sealing requirements. One ream is 3,000 square feet.

Thus, it is preferred to provide a film that has excellent adhesion to the cold seal cohesive. It is also preferred to provide a film that is compliant with US Food and Drug Administration regulations.

U.S. Pat. No. 4,252,851 discloses an oriented, multiple-layer film comprising a core layer and a skin layer comprising a propylene/butene copolymer having 10–15% butene content. The function of this layer is as a heat seal layer and there is no subsequent surface treatment performed on this heat seal layer. So, this layer would not provide a good cold adhesion to a cold seal cohesive.

U.S. Pat. No. 5,482,780 discloses a multilayer biaxially oriented polypropylene film having an isotactic polypropylene polymer core, a cold seal release layer on one side of the core and a cold seal receptive layer on the opposite side of the core. The cold seal receptive layer consists of an ethylene-propylene random copolymer containing 2–8 wt. % ethylene. This layer can either be flame or corona treated to improve cold seal receptivity.

U.S. Pat. No. 5,900,294 discloses a biaxially oriented multilayer polyolefin film which can be heat-sealed at low temperatures. The film comprises a base layer and at least one outer layer comprising a propylene/butene copolymer of 20–30 wt. % butene. This film is intended for heat-seal at low temperatures and would not provide a good cold adhesion to a cold seal cohesive.

U.S. Pat. No. 6,022,612 discloses a multilayer biaxially oriented polypropylene film having an isotactic polypropylene polymer core and a cold seal receptive layer on the opposite side of the core. The cold seal receptive layer consists of 30% to 60% by weight of a thermoplastic rubber and between 40% and 70% by weight of a polyolefin polymer. The thermoplastic rubber is either a styrene-isoprene-styrene or styrene-butadiene-styrene copolymer. The polyolefin can be virtually any polyolefin from polypropylene, polyethylene, or copolymers. This patent does not specify another treated layer for metallization on the opposite side of the core. In addition, this patent also uses a different cold seal adhesion layer formulation than the present invention.

U.S. Pat. No. 6,165,599 discloses an oriented composite film comprised of a polypropylene core, having on one or both surfaces of the core skin layers comprised of a metallocene catalyzed polypropylene and a low molecular weight hydrocarbon resin. The purpose of this skin layer is to improve such properties as the film modulus, haze, and moisture barrier transmission. This patent does not teach the use of the metallocene polypropylene polymer for subsequent surface treatment and cold seal cohesive application.

International Application WO 00/40406 discloses a film structure comprising a first outer layer comprising a migratory additive, a second outer layer comprising a metallocene polyethylene and core layer in between the two outer layers.

The metallocene polyethylene outer layer is laminated to a second film. This film does not disclose the subsequent treating or blending of the metallocene polyethylene skin layer.

In short, the prior art multi-layer polyolefin generally either contain a natural or thermoplastic rubber in the layer to which a cold seal cohesive is applied to do not provide good adhesion to cold seal cohesives or they do not provide good adhesion to cold seal adhesives/cohesives. Therefore, there is a need for a metallizable multi-layer polyolefin film that provides excellent adhesion characteristics to cold seal cohesive formulations.

SUMMARY OF THE INVENTION

The objective of this invention is to provide a film that provides an excellent bonding surface for cold seal cohesive formulations. This will result in a package, which has improved hermetic seal performance. The prior art references have used a thermoplastic or natural rubber to obtain a good cold seal adhesion. In this invention, applicants have unexpectedly found that the cold seal adhesion could be improved without the use of either a thermoplastic rubber or a natural rubber.

As will be realized, this invention is capable of other and different embodiments, and its details are capable of modifications in various obvious respects, all without departing from this invention. Accordingly, the description is to be regarded as illustrative in nature and not as restrictive.

DETAILED DESCRIPTION OF THE INVENTION

The present invention is a metallizable multi-layer polyolefin film that provides excellent adhesion characteristics to cold seal cohesive formulations. Specifically, in one embodiment, the film is a polyolefin multilayer film comprising a polyolefinic core layer, and a first polyolefin skin layer, adjacent to the core layer, comprising (or preferably consisting essentially of) a blend of an ethylene propylene random copolymer at 50–90 wt. % of the skin layer and metallocene catalyzed plastomer at 10–50% wt. % of the skin, wherein the first polyolefin skin layer does not contain a thermoplastic or natural rubber and forms a cold seal adhesion of a cohesive adhesive applied on the first polyolefin skin layer of 450 g/inch or more by a 90(degree) T-peel test, said cohesive adhesive being applied at a coating weight of 3.0 lbs/ream and aged at ambient temperature for one week.

In another embodiment, the film is a polyolefin multilayer film comprising a polyolefinic core layer, and a first polyolefin skin layer, adjacent to the core, comprising (or preferably consisting essentially of) a metallocene catalyzed isotactic polypropylene polymer, wherein the first polyolefin skin layer does not contain a thermoplastic or natural rubber and forms a cold seal adhesion of a cohesive adhesive applied on the first polyolefin skin layer of 450 g/inch or more by a 90(degree) T-peel test, said cohesive adhesive being applied at a coating weight of 3.0 lbs/ream and aged at ambient temperature for one week.

In another embodiment, the film is a polyolefin multilayer film comprising a polyolefinic core layer, and a first polyolefin skin layer, adjacent to the core layer, comprising (or preferably consisting essentially of) a butene propylene copolymer that contains from 5 wt % to 22 wt % of butene wherein the first polyolefin skin layer does not contain a thermoplastic or natural rubber and forms a cold seal adhesion of a cohesive adhesive applied on the first polyolefin skin layer of 450 g/inch or more by a 90(degree) T-peel test, said cohesive adhesive being applied at a coating weight of 3.0 lbs/ream and aged at ambient temperature for one week.

The film is formed by a biaxial orientation process. The first step of this process is to coextrude the core layer and the two skin layers from a die. The molten polymer sheet is then cast onto either a drum in a water bath or a series of internally cooled drums. The temperature of this casting is typically in the range of 70–130° F. This casting area cools and crystallizes the coextruded sheet. The unoriented film is next preheated and stretched in the longitudinal direction. Typically, this preheating takes place in the temperature range of between 220–280° F. The stretching takes place in the temperature range of between 260–300° F. The amount of stretch can range from 3 to 6 times the original length. Next, the monoaxially oriented film is stretched in the transverse direction by a tenter oven. This stretching takes place in a temperature range of from 315–350° F., however this depends on the speed of film making and the convection heat transfer to the film. The film is typically stretched from 8 to 10 times in the transverse direction. The biaxially oriented film is then relaxed at the last zones of the tenter oven to reduce shrinkage. Finally, the roll is wound into a roll and subsequent operations are performed before the film is shipped to the customer.

The thickness of the film structure is dictated by the needs of the particular customer and the machine capability of the film manufacturer. In general, the total film structure thickness of the present invention can be in the range of between 30 gauge and 120 gauge. Most preferably is in the range of from 40 gauge to 80 gauge total film thickness.

The core layer of the film consists of an isotactic polypropylene homopolymer resin. The isotactic polypropyelene resin can be defined as having a melt flow rate in the range of 1–9 g/10 min. More particularly preferred is a melt flow rate in the range of 1–5 g/10 min. Most particularly preferred is a melt flow rate in the range of 1–3 g/10 min.

It is preferable to use an isotactic polypropylene homopolymer resin for the core layer for the following reasons: 1) A high rate of crystallization, 2) greater tensile strength than linear polyethylene, 3) a higher melting temperature than polyethylene in general, and 4) low cost. These reasons make polypropylene a suitable core layer for food packaging films in general.

The cold seal adhesive skin is chosen from 1) A blend of a metallocene catalyzed ethylene/octene copolymer blend with an ethylene/propylene random copolymer, 2) a metallocene catalyzed polypropylene polymer, and 3) a butene/propylene random copolymer.

The first cold seal adhesive skin layer composition is comprised of a blend of two components. The $1^{st}$ component is an ethylene/propylene-random copolymer at 50–90 wt. % of the skin layer. The second component is a metallocene polyethylene at 10–50 wt. % of the skin resin. The blend has good compatibility of the two polymer components in the blend and excellent adhesion to the polypropylene core layer.

The ethylene-propylene random copolymer comprises about 2–12% wt. % ethylene based on the weight of the copolymer. More particularly preferred is an ethylene content of 2–9%. Most particularly preferred is an ethylene content of 2–7 wt. %. The melt flow rate is in the range of 1–10 g/10 min.

The metallocene polyethylene can be selected from the group made up of ethylene homopolymers, copolymers of ethylene and at least one $C_4$–$C_{20}$ alpha-olefin polymerized using single-site metallocene catalyst.

The metallocene polyethylene is characterized by having a density in the range of 0.865 g/cc to 0.945 g/cc. Its melting temperature in the range of 48.9° C.–123° C. can further classify this resin. Specifically, the metallocene polyethylene is preferably a very low density polyethylene having a density range of 0.89 g/cc to 0.945 g/cc, and having a melting peak range of 85° C. to 123° C. A preferred very low density polyethylene is sold by DOW Plastics, under the trademark AFFINITY™, particularly preferred is the AFFINITY™ PL 1840 metallocene plastomer. Alternatively, the metallocene polyethylene can be an ultra low density polyethylene plastomer having a density of 0.865 to 0.889 g/cc and a melting point range of 48.9° C. to 85° C. The plastomers are homopolymers of ethylene, or copolymers of ethylene with alpha olefins having 3 to 10 carbon atoms such as 1-butene, 1-hexene, and 1-octene. Such plastomers are commercially available from DOW Plastics, under the trademark ENGAGE™ and from ExxonMobil Chemicals under the trademark EXACT™.

A second cold seal adhesive skin layer composition is comprised of a metallocene catalyzed isotactic polypropylene polymer. The resin is characterized as having a melting point in the range of 150° C.–152° C. Furthermore, such resins are characterized as having a molecular weight distribution of in the range of 1.7 to 4.0. Such resins are available from AtoFina Petrochemicals under the designation EOD-00-07.

A third cold seal adhesive skin layer composition is comprised of a butene propylene copolymer. The resin is characterized as having a melting point in the range of 120° C.–145° C. Furthermore, the resin is characterized as having a butene content of from 5–22 wt. %. Such butene/propylene random copolymers are available from Union Carbide under the names CEFOR® DS4D05 or CEFOR® SRD4-188. Also, these resins are available from Solvay under the name Eltex® P KS341 and Mitsui Chemicals under the name Tafmer® XR107L.

The cold seal adhesion layer may also contain functional additives such as fillers, pigments, antiblocks, slip agents, and stabilizers. However, it is preferable to keep this surface as additive free as possible to reduce any reduction in the adhesion to cold seal cohesive compositions. Typically, antiblocks will be used in this layer to ensure for excellent processability and roll formation. Since antiblocks are not migratory in nature this will minimally affect the adhesion of the cold seal adhesion layer to the cold seal cohesive. Examples of antiblock that may be used in this layer include amorphous silica, cross-linked synthetic silicone particles, cross-linked polymethylmethacrylate particles, silicate based antiblocks, and other commercial antiblocks.

The cold seal adhesion layer should preferably be surface treated with either a corona discharge treatment, flame treatment, atmospheric plasma, or a special corona discharge treatment utilizing a mixed gas environment of nitrogen and carbon dioxide. More particularly preferred is a surface treatment consisting of a special corona discharge treatment utilizing a mixed gas environment of nitrogen and carbon dioxide or standard corona treatment. This treatment as described in U.S. Pat. No. 4,297,187 utilizes a ratio of 99.5:0.5 to 50:50 of nitrogen to carbon dioxide. More specifically, the volume ratio of nitrogen to carbon dioxide in the mixed gas is in the range of 99.2:0.8 to 80:20.

The cold seal adhesion skin layer should preferably have a low degree of crystallinity. We believe that the less crystallinity or tight molecular chain packing that exist will allow for a more successful treatment of the polymer. Typically a high crystallinity polymer or dense polymer does not allow for successful surface treatment. For example it has been tested that an ethylene/propylene random copolymer has improved cold seal adhesion after corona treatment than a polypropylene polymer does. Thus the methods disclosed in the current invention will allow for the achievement of improved chemical bonds with the cold seal cohesive. However, note that severe corona treatment produces low-molecular-weight oxidized materials on the polymer surface. These low molecular weight oxidized materials are not firmly bound to the substrate and could be a source of adhesion failure.

The second polyolefin skin layer is the same as that disclosed in Toray Industries, Inc. U.S. Pat. No. 6,190,760. This second polyolefin skin resin is a polypropylene resin with the endothermic main peak is 155 to 163° C. The heat of crystal fusion of the polypropylene resin used as the surface layer should preferably be 20 to 90 J/g. Ordinary isotactic polypropylene resin has a heat of crystal fusion of 100 J/g or more. If the peak by crystal fusion is too low, then the film will be sticky to many rolls during process and the consequence will be a decline of the metallic gloss after metallization. If the crystal fusion heat is too small, the heat resistance at the time of metallization is poor. Furthermore, the low peak temperature also affects the heat resistance of the metallized film. If the heat of crystal fusion is too large, the adhesiveness to the metallic film becomes poor. A suitable resin is mainly composed of isotactic polypropylene resin with a mesopentad fraction of 60 to 88%. A resin obtained by mixing a polypropylene copolymer resin with the endothermic peak by crystal fusion kept in a range of 140 to 163° C. to isotactic polypropylene resin with a mesopentad fraction of 60 to 88%, up to ⅓ by weight can also be preferably used.

Preferably, the outermost surface of the second polyolefin skin layer is thick enough to have a strong bond to the core layer. In addition, the thinnest areas of the skin layer thickness distribution should preferably be thick enough to have a strong bond to the core layer and to provide a surface for metal adhesion. Therefore, it is recommended that the skin layer be from 1 to 10 gauge in thickness. More preferable is a thickness in the range of from 2 to 6 gauge thickness.

The second polyolefin skin layer can be surface treated with either a corona discharge treatment, flame treatment, atmospheric plasma, or a special corona treatment utilizing a mixed gas environment of nitrogen and carbon dioxide. Most particularly preferred is a surface treatment consisting of a special corona discharge treatment utilizing a mixed gas environment of nitrogen and carbon dioxide. This second polyolefin skin layer can then be directly metallized, printed, coated, adhesive laminated, or extrusion laminated. Most particularly preferred is metallization of the second polyolefin skin layer.

The film is typically metallized in a vacuum chamber utilizing aluminum at an optical density of between 1.5 to 3.5. However, the invention is not limited to aluminum metallization as other metals can be used as well. The purpose of the aluminum vaporization layer is to provide a UV light barrier as well as a barrier to oxygen and moisture. The adhesion strength of the aluminum to the metallization skin layer provides barrier and aesthetics to the film in general. This is due to the fact that the cold seal adhesion skin layer has very effective surface treatment. This surface treatment coupled with the cold seal adhesion layer formulation will "pick-off" the aluminum layer and effectively reduce barrier and aesthetics of the film. The term "pick-off"

means the transfer of some aluminum to the cold seal adhesion layer of the film during unwinding of the metallized roll. To prevent this "pick-off" a high degree of aluminum adhesion is preferred.

EXAMPLE 1

A 92 gauge biaxially oriented polypropylene (BOPP) film was manufactured on a 3-meter wide BOPP production line. The cold seal receptive skin layer was measured at 4 gauge units. The core layer was 88 gauge units. The cold seal receptive skin consisted of 80 wt % of an ethylene/propylene random copolymer (Aristech 200706G) containing 5 wt. % ehtylene, additionally 20 wt. % of an ethylene/octene plastomer (AFFINITY™PL1840) was also added to the skin layer formulation. The melt flow rate of the ethylene/propylene random copolymer was 8 g/10 min measured by ASTM D1238. The density of the plastomer was 0.909 g/cc. The peak melting temperature of the plastomer was 105.5° C. as measured by DSC. The melt flow rate of the ethylene octene plastomer was 1.0 g/10 min as measured by ASTM D 1238. The core layer was made up of isotactic polypropylene homopolymer. The melt flow rate of the core isotactic polypropylene homopolymer was 1.6 g/10 min.

The sheet was heated to 135° C., stretched 5 times in the machine direction, cooled, introduced into a tenter oven, heated to 164° C., stretched to 9 times in the transverse direction and cooled. Furthermore, corona discharge treatment was used to treat the cold seal receptive skin layer.

EXAMPLE 2

Films were formed and evaluated under the same conditions as in Example 1, except that the cold seal receptive layer consisted of a metallocene isotactic polypropylene (AtoFina EOD-00-07). The melt flow of the metallocene catalyzed polypropylene was 8 g/10 min measured by ASTM D 1238. The peak melting temperature was 150–152° C. as measured by ASTM D 792.

EXAMPLE 3

Films were formed and evaluated under the same conditions as in Example 1, except that the cold seal receptive skin is 100 wt. % of a propylene/butene random copolymer (Union Carbide CEFOR® SRD4-188) that comprised 5 wt. % of butene comonomer. The melt flow of the propylene/butene random copolymer was 5 g/10 min measured by ASTM D1238. The melting temperature of the copolymer was 145° C. as measured by ASTM D 792.

EXAMPLE 4

Films were formed and evaluated under the same conditions as in Example 1, except that the cold seal receptive skin consisted of 100 wt. % of a propylene/butene random copolymer (Union Carbide CEFOR® DS4D05) that comprised 14 wt. % of butene comonomer. The melt flow of the propylene/butene random copolymer was 6.5 g/10 min measured by ASTM D1238. The melting temperature of the copolymer was 131° C. as measured by ASTM D 792.

COMPARATIVE EXAMPLE 1

Films were formed and evaluated under the same conditions as in Example 1, except that the cold seal receptive skin layer is an isotactic polypropylene homopolymer. The melt flow rate of this isotactic polypropylene skin resin was 8 g/10 min.

The aforementioned films were first adhesive laminated to 60 gauge BOPP cold seal release film. The adhesive used in the laminations were Upaco 2593 and Upaco 2594 two part polyurethane. AtoFindley C1099 cold seal cohesive was applied uniformly across the laminated web at 2.9–3.0 lbs/ream using a Faustel direct gravure coater. Cold seal adhesion bonds were measured by taking cold seal cohesive, coated and dried to a coating weight of 3.0 lbs/ream onto film specimens. The samples were then cut into 1-inch strips and on the same day sealed on a Sentinel model 12A heat sealer, using teflon-coated flat sealing jaws at room temperature, 80 psi, 0.5 second dwell. The samples were then aged under ambient conditions and tested at 1 week after the initial cohesive coating date and again 5 weeks after to test the aging effects of the cold seal cohesive bond to the film lamination. The sealed samples are then tested for seal strength on an Instron tensile tester by a 90(degree) T-peel test, using a 90(degree) T-peel angle while pulling. Bond strength is recorded in g/in.

TABLE 1

Cold Seal Adhesion Results

| Film | Week 1 (Cold Seal Strength g/in) | Week 5 (Cold Seal Strength g/in) |
| --- | --- | --- |
| Example 1 | 600 | 600 |
| Example 2 | 600 | 550 |
| Example 3 | 550 | 550 |
| Example 4 | 600 | 575 |
| Comp. Example 1 | 400 | 400 |

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations. Persons skilled in the art would recognize that the numerical ranges disclosed inherently support any range within the disclosed numerical ranges even though a precise range limitation is not stated verbatim in the specification because this invention can be practiced throughout the disclosed numerical ranges. A holding to the contrary would "let form triumph over substance" and allow the written description requirement to eviscerate claims that might be narrowed during prosecution simply because the applicants broadly disclose in this application but then might narrow their claims during prosecution. Finally, the entire disclosure of the priority documents, patents and publications referred in this application are hereby incorporated herein by reference.

What is claimed is:

1. A polyolefin multilayer film comprising a polyolefinic core layer, and a first polyolefin skin layer, adjacent to the core layer, comprising a blend of an ethylene propylene random copolymer at 50–90 wt. % of the skin layer and metallocene catalyzed plastomer at 10–50% wt. % of the skin, wherein the first polyolefin skin layer does not contain a thermoplastic or natural rubber and provides a cold seal receptive surface for a cold seal adhesive.

2. The polyolefin multilayer film according to claim 1, further comprising a second polyolefin skin opposite the core layer from said first polyolefin skin layer.

3. The polyolefin multilayer film according to claim 1, wherein the first polyolefin skin layer is corona treated.

4. The polyolefin multilayer film according to claim 1, wherein said polyolefinic core layer comprises isotactic polypropylene.

5. The polyolefin multilayer film according to claim 2, wherein said second polyolefin skin layer is made of a polypropylene resin with the endothermic main peak of crystal fusion in a range of 155 to 1630° C. and with a heat of crystal fusion in the range of 20 to 90 J/g.

6. The polyolefin multilayer film according to claim 2, wherein said second polyolefin skin layer is subjected to a surface treatment selected from the group consisting of corona discharge treatment, flame treatment, atmospheric plasma treatment, and corona discharge treatment in a nitrogen and carbon dioxide environment.

7. The polyolefin multilayer film according to claim 2, wherein said second polyolefin skin layer is surface treated by a corona discharge treatment in a nitrogen and carbon dioxide environment.

8. The polyolefin multilayer film according to claim 1, wherein said polyolefin multilayer film is a biaxially oriented film.

9. The polyolefin multilayer film according to claim 1, wherein said ethylene propylene random copolymer is from 2 wt % to 7 wt % ethylene content.

10. The polyolefin multilayer film according to claim 9, wherein said ethylene propylene random copolymer is from 2.5 wt. % to 5 wt. % ethylene content.

11. The polyolefin multilayer film according to claim 1, wherein said metallocene catalyzed plastomer is selected from the group consisting of ethylene homopolymers, copolymers of ethylene and at least one $C_4$–$C_{20}$ alpha-olefin.

12. The polyolefin multilayer film according to claim 1, wherein said metallocene catalyzed plastomer has a density in the range from 0.86 $g/cm^3$ to 0.945 $g/cm^3$.

13. The polyolefin multilayer film according to claim 12, wherein said metallocene catalyzed plastomer has a density in the range from 0.89 $g/cm^3$ to 0.91 $g/cm^3$.

14. The polyolefin multilayer film according to claim 1, wherein said first polyolefin skin layer further comprises a blend of ethylene propylene copolymer at 60–80 wt. % of the skin layer and an ethylene octene plastorner at 20–40 wt. % of the skin layer.

15. The polyolefin multilayer film according to claim 1, wherein said first polyolefin skin layer further comprises a blend of ethylene propylene copolymer at 75–85 wt. % of the skin layer and an ethylene octene plastomer at 15–25 wt. % of the skin layer.

16. The polyolefin multilayer film according to claim 1, wherein said first polyolefin skin layer is subjected to a surface treatment selected from the group consisting of corona discharge treatment, flame treatment, atmospheric plasma treatment, and corona discharge treatment in a mixed gas environment of nitrogen and carbon dioxide.

17. The polyolefin multilayer film according to claim 1, wherein said surface treatment is corona discharge treatment or corona discharge treatment in a mixed gas environment of nitrogen and carbon dioxide.

18. The polyolefin multilayer film according to claim 1, wherein said first polyolefin skin layer forms a cold seal adhesion of the cold seal adhesive applied on the first polyolefin skin layer of 450 g/inch or more by a 90(degree) T-peel test, said cold seal adhesive being applied at a coating weight of 3.0 lbs/ream and aged at ambient temperature for one week.

* * * * *